United States Patent
Mokhtari et al.

(10) Patent No.: US 10,907,016 B2
(45) Date of Patent: Feb. 2, 2021

(54) SOLVENT-FREE PHASE-INVERSION EMULSIFICATION PROCESS FOR PRODUCING AMORPHOUS POLYESTER RESIN EMULSIONS

(71) Applicant: XEROX CORPORATION, Norwalk, CT (US)

(72) Inventors: Hajir Mokhtari, North York (CA); Shivanthi Easwari Sriskandha, Mississauga (CA); Guerino G. Sacripante, Oakville (CA)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 16/172,493

(22) Filed: Oct. 26, 2018

(65) Prior Publication Data
US 2020/0131317 A1 Apr. 30, 2020

(51) Int. Cl.
| | | |
|---|---|---|
| *G03G 9/08* | (2006.01) | |
| *C08J 3/07* | (2006.01) | |
| *C08K 3/22* | (2006.01) | |
| *G03G 9/087* | (2006.01) | |

(52) U.S. Cl.
CPC .................................. *C08J 3/07* (2013.01); *C08K 3/22* (2013.01); *G03G 9/0804* (2013.01); *G03G 9/08755* (2013.01); *C08J 2367/02* (2013.01)

(58) Field of Classification Search
CPC . G03G 9/0802; G03G 9/0804; G03G 9/08755
See application file for complete search history.

(56) References Cited

U.S. PATENT DOCUMENTS

| | | |
|---|---|---|
| 3,590,000 A | 6/1971 | Palermiti et al. |
| 3,800,588 A | 4/1974 | Larson et al. |
| 4,298,672 A | 11/1981 | Lu |
| 4,338,390 A | 7/1982 | Lu |
| 5,290,654 A | 3/1994 | Sacripante et al. |
| 5,302,486 A | 4/1994 | Patel et al. |
| 6,063,827 A | 5/2000 | Sacripante et al. |
| 6,214,507 B1 | 4/2001 | Sokol et al. |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 2006/0222991 A1 | 10/2006 | Sacripante et al. |
| 2007/0141494 A1* | 6/2007 | Zhou .................... G03G 9/0804 430/105 |
| 2011/0104609 A1* | 5/2011 | Qiu ...................... G03G 9/0804 430/137.14 |

* cited by examiner

*Primary Examiner* — Peter L Vajda
(74) *Attorney, Agent, or Firm* — Pillsbury Winthrop Shaw Pittman LLP

(57) ABSTRACT

An organic solvent-free phase-inversion emulsification process for a low molecular weight amorphous polyester resin includes forming a mixture by adding to the amorphous polyester resin: i. a surfactant; ii. an aqueous solution of a neutralizing agent; and iii. a portion of water that is about 40% or less of a total amount of water used to form a phase-inversion emulsion, heating the mixture to dissolve the amorphous polyester resin to provide a dissolved amorphous polyester and adding water up to the total amount of water to the dissolved amorphous polyester to form a latex of the amorphous polyester resin. The resultant latex is used in processes of making a toner composition. A latex of an amorphous polyester resins is made by such processes have latex particles that are unimodal.

16 Claims, 5 Drawing Sheets

SOLVENT-FREE PHASE-INVERSION EMULSIFICATION PROCESS FOR PRODUCING AMORPHOUS POLYESTER RESIN EMULSIONS

BACKGROUND

The present disclosure relates to polyester emulsions employed in the manufacture of toner compositions. In particular, the present disclosure relates to a solvent-free phase-inversion emulsification method to produce polyester resin emulsions.

Toner particles prepared via emulsion aggregation processes employ aqueous latex preparations of their constituent polymer resins, which typically comprise amorphous polyester resins. Various methods have been developed to prepare the requisite aqueous latexes including phase inversion emulsification (PIE). Currently, an organic solvent-based PIE process is most often used to emulsify the amorphous polyester resins into a latex form. The process involves dissolving the resin in a mixed organic solvent system of methyl ethyl ketone (MEK) and isopropanol (IPA) followed by heating to dissolve the resin. Base neutralization using ammonium hydroxide and water addition then follow to facilitate the phase inversion. However, the organic solvents need to be evaporated at the end of the emulsification process using vacuum distillation which is time consuming, power intensive and the organic solvent mixture is not readily recycled.

Recently, a process for conducting an organic solvent-free emulsification process for a crystalline polyester resin has been developed. However, an organic solvent free phase inversion emulsification process for amorphous polyester resins directly into a latex form has not been achieved.

Although it would be beneficial to develop an economical organic solvent-free based phase inversion emulsification process for amorphous polyester resins, their higher viscosity (see FIG. 1) compared to the crystalline polyester resins (CPE) leads to a time consuming melt phase in large scale production reactors. The present disclosure addresses this issue by partitioning the total water used in latex formation upfront with the dry resin powder to aid as a heat transfer medium and to expedite the melt stage. These and other advantages of the present disclosure will be apparent to those skilled in the art.

SUMMARY

In some aspects, embodiments herein related to organic solvent-free phase-inversion emulsification processes for a low molecular weight amorphous polyester resin comprising forming a mixture by adding to the amorphous polyester resin: i. a surfactant; ii. an aqueous solution of a neutralizing agent; and iii. a portion of water that is about 40% or less of a total amount of water used to form a phase-inversion emulsion, the process comprising heating the mixture to dissolve the amorphous polyester resin to provide a dissolved amorphous polyester and adding water up to the total amount of water to the dissolved amorphous polyester to form a latex of the amorphous polyester resin.

In embodiments, there are provided processes of making a toner composition comprising providing a phase-inversion emulsion of an amorphous polyester resin, the phase-inversion emulsion made by a process comprising forming a mixture by adding to the amorphous polyester resin i. a surfactant; ii. an aqueous solution of a neutralizing agent; and iii. a portion of water that is about 40% or less of a total amount of water used to form a phase-inversion emulsion, the process comprising heating the mixture to dissolve the amorphous polyester resin to provide a dissolved amorphous polyester; adding water up to the total amount of water to the dissolved amorphous polyester to form a latex of the amorphous polyester resin, and aggregating and coalescing particles of the latex in the presence of a catalyst to form a core toner particle.

In embodiments, there are provided latex of an amorphous polyester resins made by the process of forming a mixture by adding to the amorphous polyester resin: i. a surfactant; ii. an aqueous solution of a neutralizing agent; and iii. a portion of water that is about 40% or less of a total amount of water used to form a phase-inversion emulsion, the processes comprising heating the mixture to dissolve the amorphous polyester resin to provide a dissolved amorphous polyester and adding water up to the total amount of water to the dissolved amorphous polyester to form a latex of the amorphous polyester resin, wherein particles of the latex are unimodal.

BRIEF DESCRIPTION OF DRAWINGS

Various embodiments of the present disclosure will be described herein below with reference to the figures wherein.

DETAILED DESCRIPTION

Figure 1:
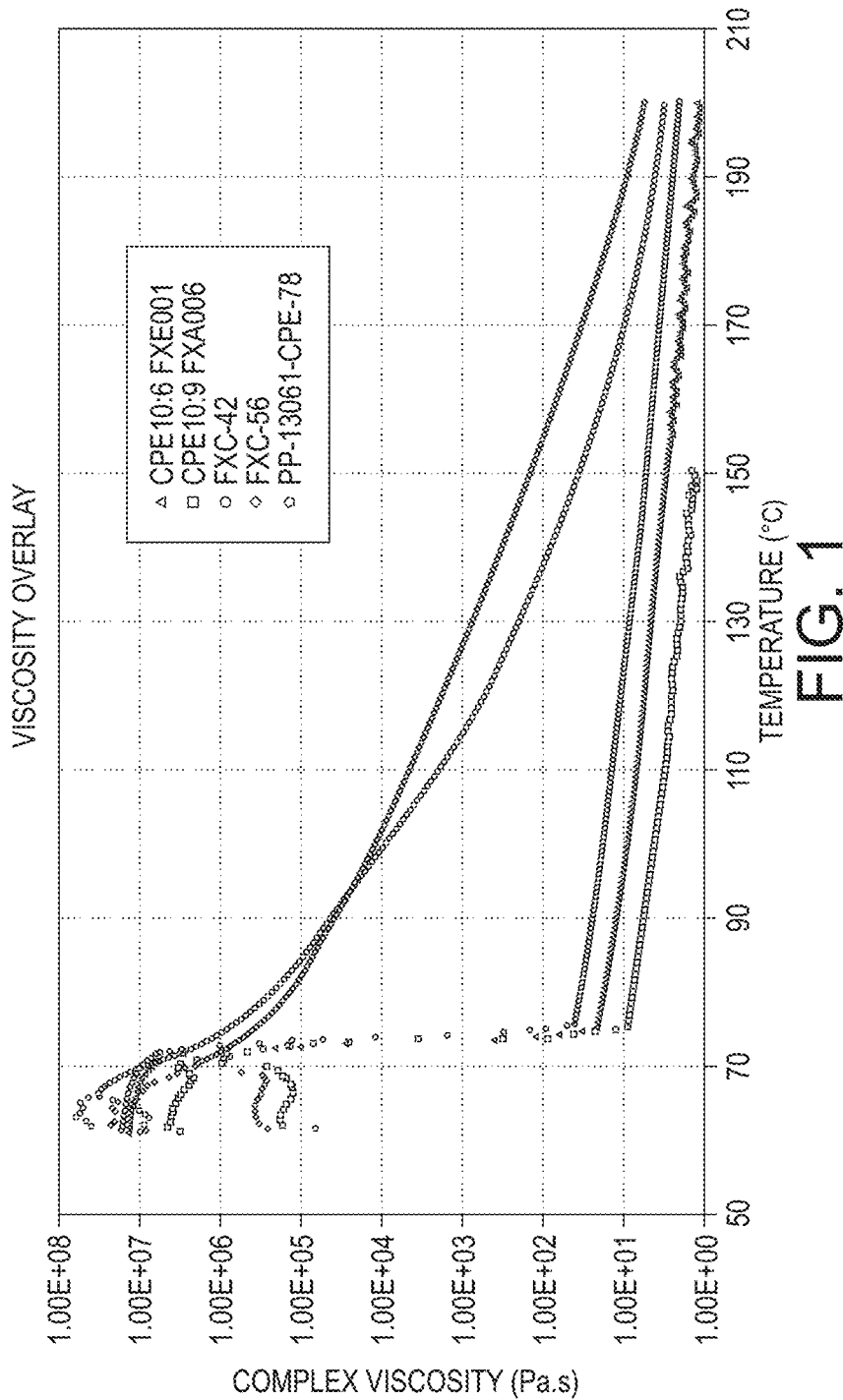
FIG. 1 shows a plot of viscosity versus temperature for crystalline polyesters PP-78 (a crystalline polyester comprising poly(1,6-hexylene-1,12 dodecanoate)), FXE001 (a crystalline polyester comprising poly(1,6-hexylene-1,12 dodecanoate)), and FXA006 (a crystalline polyester poly(1,9-nonylene-1,12 dodecanoate)), and amorphous polyesters FXC56 (a high molecular weight amorphous polyester resin comprising terpoly-(propoxylated bisphenol A-terephthalate) terpoly-(propoxylated bisphenol A-dodecenylsuccinate) terpoly-(propoxylated bisphenol A fumarate), and FXC42 (a low molecular weight amorphous polyester resin comprising terpoly-(propoxylated bisphenol A-terephthalate) terpoly-(propoxylated bisphenol A-dodecenylsuccinate) terpoly-(propoxylated bisphenol A fumarate).

The current disclosure provides methods for one-pot organic solvent-free phase inversion emulsification process from an amorphous resin. The methods employ a surfactant, sodium hydroxide solution and a portion of the total water needed, and which are added to the dry amorphous resin powder followed by heating to produce the latex emulsion. The phase inversion process is completed by adding the remainder of the total water needed at 125° C., resulting in a latex of about 40 to about 45% solids by weight.

In embodiments, there are provided organic solvent-free phase-inversion emulsification process for a low molecular weight amorphous polyester resin comprising forming a mixture by adding to the amorphous polyester resin: i. a surfactant; ii. an aqueous solution of a neutralizing agent; and iii. a portion of water that is about 40% or less of a total amount of water used to form a phase-inversion emulsion, the process comprising heating the mixture to dissolve the amorphous polyester resin to provide a dissolved amorphous polyester and adding water up to the total amount of water to the dissolved amorphous polyester to form a latex of the amorphous polyester resin.

In embodiments, the latex comprises unimodal latex particles. Such unimodal particles of the latex may have a diameter $D_{50}$ from about 100 nm to about 300 nm.

In embodiments, the low molecular weight amorphous polyester resin comprises a combination of monomer units selected from the group consisting of a propoxylated bisphenol A, an ethoxylated bisphenol A, a terephthalic acid, a fumaric acid, and a dodecenyl succinic anhydride. In embodiments, the low molecular weight amorphous polyester resin has a Tg from about 45° C. to 65° C. As used herein, "low molecular weight amorphous polyester resin" means a resin having a Mw in a range from about 5,000 Daltons to 60,000 Daltons.

In embodiments, the processes employ an anionic surfactant. The surfactant may be present in an amount from about 1.5 pph to about 3.5 pph relative to the amount of low molecular weight amorphous resin, by weight.

In embodiments, the processes empoly a neutralizing agent comprising sodium hydroxide. Sodium hydroxide is present in an amount from about 1.5 pph to about 4 pph.

In embodiments, the portion of water employed in the present processes up front is about 10% to about 40% of the total amount of water used to form a phase-inversion emulsion, including any sub-range in between and fractions thereof.

In embodiments, there are provided processes of making a toner composition comprising providing a phase-inversion emulsion of an amorphous polyester resin, the phase-inversion emulsion made by a process comprising forming a mixture by adding to the amorphous polyester resin i. a surfactant; ii. an aqueous solution of a neutralizing agent; and iii. a portion of water that is about 40% or less of a total amount of water used to form a phase-inversion emulsion, the process comprising heating the mixture to dissolve the amorphous polyester resin to provide a dissolved amorphous polyester; adding water up to the total amount of water to the dissolved amorphous polyester to form a latex of the amorphous polyester resin, and aggregating and coalescing particles of the latex in the presence of a catalyst to form a core toner particle.

In embodiments, processes further comprise forming a shell disposed conformally about the core toner particle.

In embodiments, the aggregating and coalescing step is performed in the presence of a wax.

In embodiments, the aggregating and coalescing step is performed in the presence of a crystalline polyester latex.

In embodiments, there are provided latex of an amorphous polyester resins made by the process of forming a mixture by adding to the amorphous polyester resin: i. a surfactant; ii. an aqueous solution of a neutralizing agent; and iii. a portion of water that is about 40% or less of a total amount of water used to form a phase-inversion emulsion, the processes comprising heating the mixture to dissolve the amorphous polyester resin to provide a dissolved amorphous polyester and adding water up to the total amount of water to the dissolved amorphous polyester to form a latex of the amorphous polyester resin, wherein particles of the latex are unimodal.

Resins

In some embodiments, the polyester resin employed in the processes disclosed herein comprises a first amorphous polyester. In some embodiments, the polyester resin further comprises a second amorphous polyester. For example, two types of amorphous acidic polyester resins (low Mw FXC-42 and high Mw FXC-56, Kao Corporation, Japan) are commonly incorporated into Ultra-low-melt (ULM) toners, and these resins may account for about 75% to about 78% of the toner components. To make ULM toner, each resin is typically emulsified into an aqueous dispersion or emulsion (latex). The organic solvent-free phase inversion emulsification (PIE) processes disclosed herein can be employed to form the requisite polyester resin emulsions for making such toners.

In some embodiments, the first amorphous polyester and the second amorphous polyester may be present in a total amount in a range of from about 40% by weight to about 95% by weight of the latex.

In some embodiments, first amorphous polyester and second amorphous polyester are present in a ratio from about 0.1:0.9 to about 0.9:0.1, including any ratio in between.

In some embodiments, a further polyester resin may be employed in producing a toner, such further polyester comprising a crystalline polyester. In some embodiments, the crystalline polyester is present in an amount in a range of from about 1.0% by weight to about 35.0% by weight of the latex.

Any resin may be utilized in forming a latex emulsions of the present disclosure, though the processes disclosed herein are specifically beneficial for the organic solvent-free production of amorphous polyesters. In embodiments, the resins used in making a final toner product by emulsion aggregation may comprise an amorphous resin, a crystalline resin, and/or a combination thereof. In embodiments, the amorphous resin made by the processes disclosed herein may be used in conjunction with a crystalline polyester resin with acidic groups having an acid number of about 1 mg KOH/g polymer to about 200 mg KOH/g polymer, in embodiments from about 5 mg KOH/g polymer to about 50 mg KOH/g polymer. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12- dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 85 percent by weight of the toner components, in embodiments from about 5 to about 50 percent by weight of the toner components. The crystalline resin can possess various melting points of, for example, from about 30° C. to about 120° C., in embodiments from about 50° C. to about 90° C. The crystalline resin may have a number average molecular weight (Mn), as measured by gel permeation chromatography (GPC) of, for example, from about 1,000 to about 50,000, in embodiments from about 2,000 to about 25,000, and a weight average molecular weight (Mw) of, for example, from about 2,000 to about 100,000, in embodiments from about 3,000 to about 80,000, as determined by Gel Permeation Chromatography using polystyrene standards. The molecular weight distribution (Mw/Mn) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

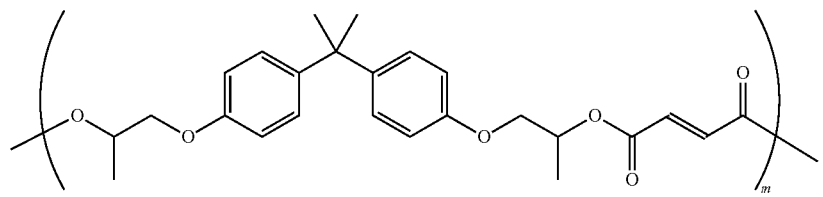

wherein m may be from about 5 to about 1000. Examples of such resins and processes for their production include those disclosed in U.S. Pat. No. 6,063,827, the disclosure of which is hereby incorporated by reference in its entirety.

In embodiments, a suitable polyester resin may be an amorphous polyester based on any combination of propoxylated bisphenol A, ethoxylated bisphenol A, terephthalic acid, fumaric acid, and dodecenyl succinic anhydride. FXC-42, available from Kao Corporation, Japan, is an example of such an amorphous ester.

An example of a linear propoxylated bisphenol A fumarate resin which may be utilized as a latex resin is available under the trade name SPAMII from Resana S/A Industrias Quimicas, Sao Paulo, Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

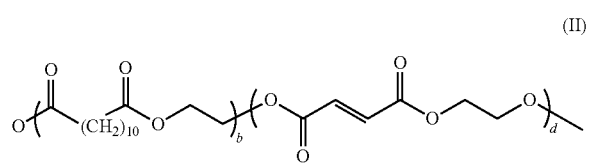

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

An amorphous resin may be present, for example, in an amount of from about 5 to about 95 percent by weight of the toner components, in embodiments from about 30 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the amorphous resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Neutralizing Agent

In some embodiments, processes disclosed herein may employ a neutralizing agent selected from the group consisting of ammonium hydroxide, potassium hydroxide, sodium hydroxide, sodium carbonate, sodium bicarbonate, lithium hydroxide, potassium carbonate, organoamines, and combinations thereof.

In embodiments, the resin may be mixed with a weak base or neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic neutralizing agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]

octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

The basic neutralizing agent may be utilized in an amount of from about 0.001% by weight to 50% by weight of the resin, in embodiments from about 0.01% by weight to about 25% by weight of the resin, in embodiments from about 0.1% by weight to 5% by weight of the resin. In embodiments, the neutralizing agent may be added in the form of an aqueous solution. In other embodiments, the neutralizing agent may be added in the form of a solid.

Utilizing the above basic neutralizing agent in combination with a resin possessing acid groups, a neutralization ratio of from about 25% to about 500% may be achieved, in embodiments from about 50% to about 300%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11. The neutralization of the acid groups may, in embodiments, enhance formation of the emulsion.

Surfactants

In embodiments, the process of the present disclosure comprise adding a surfactant, before or during the dissolution, to the polyester resin. In embodiments, the surfactant may be added prior to dissolution of the polyester resin at an elevated temperature. Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 16% by weight of the resin, in other embodiments, from about 1% to about 14% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108.

Combinations of these surfactants and any of the foregoing surfactants may be utilized in embodiments.

Processing

In embodiments, there are provided organic solvent-free phase-inversion emulsification processes for an amorphous polyester resin comprising forming a mixture by adding to the amorphous polyester resin: i. a surfactant; ii. an aqueous solution of a neutralizing agent; and iii. a portion of water that is about 40% or less of a total amount of water used to form a phase-inversion emulsion, the process comprising heating the mixture to dissolve the amorphous polyester resin to provide a dissolved amorphous polyester and adding water up to the total amount of water to the dissolved amorphous polyester to form a latex of the amorphous polyester resin. In practice, a desired target total amount of water for the final latex is first determined. The portion of water employed can be calculated from this target total amount. The total amount may account for any contribution from the aqueous solution of the neutralizing agent. The process yields a latex comprising unimodal latex particles.

A total amount of water used to form a phase-inversion emulsion is any amount with reference to the desired size of the batch of latex to be prepared. Thus, before preparing the phase-inversion emulsion, there is a process step of determining the total amount of water that is desired for the latex batch. The total amount of water is calculated so that the percent solids by weight of the resulting latex is 40%.

In embodiments, the unimodal particles of the latex have a diameter $D_{50}$ from about 100 nm to about 300 nm. In embodiments the $D_{50}$ is from about 150 nm to about 200 nm. Moreover, the distribution band is quite narrow for these latex particles usually from about 40 to about 50 nm as measured by the Nanotrac instrument.

In embodiments, the low molecular weight amorphous polyester resin is selected from any combination of propoxylated bisphenol A, ethoxylated bisphenol A, terephthalic acid, fumaric acid, and dodecenyl succinic anhydride.

In embodiments, the surfactant is anionic. In embodiments, the surfactant is present in an amount from about 1.5 pph to about 3.5 pph relative to the amount of low molecular weight amorphous resin, by weight.

In embodiments, the neutralizing agent comprises sodium hydroxide. In embodiments, sodium hydroxide is present in and amount from about 1.5 pph to about 4 pph relative to the amount of low molecular weight amorphous resin, by weight.

In embodiments, the portion of water is about 10% to about 40% of the total amount of water used to form a phase-inversion emulsion. Again this calculation can account for the amount of water used in the aqueous solution of the neutralizing agent.

In embodiments, there are provided processes of making a toner composition comprising providing a phase-inversion emulsion of an amorphous polyester resin, the phase-inversion emulsion made by a process comprising forming a mixture by adding to the amorphous polyester resin: i. a surfactant; ii. an aqueous solution of a neutralizing agent; and iii. a portion of water that is about 40% or less of a total amount of water used to form a phase-inversion emulsion, the process comprising heating the mixture to dissolve the amorphous polyester resin to provide a dissolved amorphous polyester and adding water up to the total amount of water to the dissolved amorphous polyester to form a latex of the amorphous polyester resin, and aggregating and coalescing particles of the latex in the presence of a catalyst to form a core toner particle.

In embodiments, such processes may further comprise forming a shell disposed conformally about the core toner particle.

Other entities are typically present in the formation of toner particles from latexes. In embodiments, the aggregating and coalescing step is performed in the presence of a crystalline polyester latex. In embodiments, the aggregating and coalescing step is performed in the presence of a wax. In embodiments, the catalyst is a Lewis acid, as discussed herein further below.

In embodiments, there are provides latexes of an amorphous polyester resin made by the process of forming a mixture by adding to the amorphous polyester resin: i. a surfactant; ii. an aqueous solution of a neutralizing agent; and iii. a portion of water that is about 40% or less of a total amount of water used to form a phase-inversion emulsion, the process further comprising heating the mixture to dissolve the amorphous polyester resin to provide a dissolved amorphous polyester and adding water up to the total amount of water to the dissolved amorphous polyester to form a latex of the amorphous polyester resin, wherein particles of the latex are unimodal.

The present processes may allow the processing of more than one polyester resin in the same latex batch. In some such embodiments, the resins may be all pre-blended together prior to processing. In embodiments, the resin may be a mixture of amorphous and crystalline resins and the temperature employed for dissolution may be above the glass transition temperature of the mixture.

In embodiments emulsifying neutralized polyester resins may comprise adding water into the solution of neutralized resin until phase inversion occurs to form a phase inversed latex emulsion. Emulsification may be followed by distilling the latex to remove from it organic solvent, water or a mixture of the two.

In embodiments, the neutralizing agent which may be utilized in the process of the present disclosure includes the agents mentioned hereinabove. In embodiments, an optional surfactant employed in the process may be any of the surfactants to ensure that proper resin neutralization occurs and leads to a high quality latex with low coarse content.

In embodiments, the surfactant may be added to the one or more ingredients of the resin composition before, during, or after any mixing. In embodiments, the surfactant may be added before, during, or after the addition of the neutralizing agent. In embodiments, the surfactant may be added prior to the addition of the neutralizing agent. In embodiments, a surfactant may be added to a pre-blend mixture prior to dissolution.

In embodiments, a continuous phase inversed emulsion may be formed. Phase inversion can be accomplished by continuing to add an aqueous alkaline solution or basic agent, optional surfactant and/or water compositions to create a phase inversed emulsion which includes a disperse phase including droplets possessing the molten ingredients of the resin composition, and a continuous phase including a surfactant and/or water composition.

Stirring, although not necessary, may be utilized to enhance formation of the latex. Any suitable stirring device may be utilized. In embodiments, the stirring may be at a speed of from about 10 revolutions per minute (rpm) to about 5,000 rpm, in embodiments from about 20 rpm to about 2,000 rpm, in other embodiments from about 50 rpm to about 1,000 rpm. The stirring need not be at a constant speed, but may be varied. For example, as the mixture becomes more uniform, the stirring rate may be increased. In embodiments, a homogenizer (that is, a high shear device), may be utilized to form the phase inversed emulsion, but in other embodiments, the process of the present disclosure may take place without the use of a homogenizer. Where utilized, a homogenizer may operate at a rate of from about 3,000 rpm to about 10,000 rpm.

Although the point of phase inversion may vary depending on the components of the emulsion, any temperature of heating, the stirring speed, and the like, phase inversion may occur when the basic neutralization agent, optional surfactant, and/or water has been added so that the resulting resin is present in an amount from about 5% by weight to about 70% by weight of the emulsion, in embodiments from about 20% by weight to about 65% by weight of the emulsion, in other embodiments from about 30% by weight to about 60% by weight of the emulsion.

Following phase inversion, additional surfactant, water, and/or aqueous alkaline solution may optionally be added to dilute the phase inversed emulsion, although this is not required. Following phase inversion, the phase inversed emulsion may be cooled to room temperature if heat was employed, for example from about 20° C. to about 25° C.

The emulsified polyester resin particles in the aqueous medium may have a submicron size, for example of about 1 μm or less, in embodiments about 500 nm or less, such as from about 10 nm to about 500 nm, in embodiments from about 50 nm to about 400 nm, in other embodiments from about 100 nm to about 300 nm, in some embodiments about 200 nm. Adjustments in particle size can be made by modifying the ratio of solvent to resin, the neutralization ratio, solvent concentration, and solvent composition.

Particle size distribution of a latex of the present disclosure may be from about 30 nm to about 500 nm, in embodiments, from about 125 nm to about 400 nm.

The coarse content of the latex of the present disclosure may be from about 0.01% by weight to about 5% by weight, in embodiments, from about 0.1% by weight to about 3% by weight. The solids content of the latex of the present disclosure may be from about 10% by weight to about 50% by weight, in embodiments, from about 20% by weight to about 45% by weight.

The emulsions of the present disclosure may then be utilized to produce particles that are suitable for formation of toner particles.

Toner

Once the amorphous polyester resin has been converted into a latex and it may be utilized to form a toner by any process within the purview of those skilled in the art. The latex may be contacted with a colorant, optionally in a dispersion, and other additives to form an ultra low melt toner by a suitable process, in embodiments, an emulsion aggregation and coalescence process.

In embodiments, the optional additional ingredients of a toner composition including colorant, wax, and other additives, may be added before, during or after mixing the resin to form the emulsion. The additional ingredients may be added before, during or after formation of the latex emulsion. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, or from about 1 to about 15% by weight of the toner, or from about 3 to about 10% by weight of the toner, although the amount of colorant can be outside of these ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites M08029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

In general, suitable colorants may include Paliogen Violet 5100 and 5890 (BASF), Normandy Magenta RD-2400 (Paul Uhlrich), Permanent Violet VT2645 (Paul Uhlrich), Heliogen Green L8730 (BASF), Argyle Green XP-111-S(Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871 K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991 K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta EO2 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850: 1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900™, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight. However, amounts outside these ranges can also be used, in embodiments.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Toner Preparation

The toner particles may be prepared by any process within the purview of one skilled in the art. Although embodiments relating to toner particle production are described below with respect to emulsion aggregation processes, any suitable process of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the polyester resins described above, optionally in surfactants, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in other embodiments from about 0.5% to about 5% by weight, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the shell resin latex is added.

Shell Resin

In embodiments, after aggregation, but prior to coalescence, a resin coating may be applied to the aggregated particles to form a shell thereover. In embodiments, the core may thus include a crystalline resin, as described above. Any resin described above may be utilized as the shell. In embodiments, a polyester amorphous resin latex as described above may be included in the shell. In embodiments, the polyester amorphous resin latex described above may be combined with a different resin, and then added to the particles as a resin coating to form a shell.

In embodiments, resins which may be utilized to form a shell include, but are not limited to, a crystalline resin latex described above, and/or the amorphous resins described above. In embodiments, an amorphous resin which may be utilized to form a shell in accordance with the present disclosure includes an amorphous polyester, optionally in combination with a crystalline polyester resin latex described above. Multiple resins may be utilized in any suitable amounts. In embodiments, a first amorphous polyester resin, for example an amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any process within the purview of those skilled in the art. In embodiments, the resins utilized to form the shell may be in an emulsion including any surfactant described above. The emulsion possessing the resins, optionally the crystalline polyester resin latex described above, may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

The shell may be present in an amount of from about 1 percent by weight to about 80 percent by weight of the latex particles, in embodiments of from about 10 percent by weight to about 40 percent by weight of the latex particles, in still further embodiments from about 20 percent by weight to about 35 percent by weight of the latex particles.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

In embodiments, the final size of the toner particles may be of from about 2 µm to about 12 µm, in embodiments of from about 3 µm to about 10 µm.

Coalescence

Following aggregation to the desired particle size and application of any optional shell, the particles may then be coalesced to the desired final shape, the coalescence being achieved by, for example, heating the mixture to a temperature of from about 45° C. to about 150° C., in embodiments from about 55° C. to about 99° C., which may be at or above the glass transition temperature of the resins utilized to form the toner particles, and/or reducing the stirring, for example to from about 20 rpm to about 1000 rpm, in embodiments from about 30 rpm to about 800 rpm. Coalescence may be accomplished over a period of from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling process may include introducing cold water to a jacket around the reactor. After cooling, the toner particles may be optionally washed with water, and then dried. Drying may be accomplished by any suitable process for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. TiO2 may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000, 3,800,588, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Example 1

This example describes the determination of process conditions for phase-inversion emulsification to prepare aqueous latex preparations of amorphous polyester resins.

All organic solvent-free phase inversion experiments were conducted with a 2-L Buchi reactor equipped with one P4 impeller at 200-500 mixing rpm, at 125° C. and with pressure being internally built by water to about 100-120 kPa. The low molecular weight amorphous polyester resin comprising terpoly-(propoxylated bisphenol A-terephthalate) terpoly-(propoxylated bisphenol A-dodecenylsuccinate) terpoly-(propoxylated bisphenol A fumarate), Tayca-Power BN2060 surfactant from Tayca Corporation, and a 2M sodium hydroxide solution was used for all the experiments. Five initial formulations were prepared and tested and the resulting latex properties are summarized in Table 1.

TABLE 1

| Sample ID | NaOH pph | Tayca pph | % DIW upfront | PS D50 (nm) | % Solids |
|---|---|---|---|---|---|
| 1 | 0.9 | 3.60 | 10% | 176 | 44.61 |
| 2 | 0.9 | 3.60 | 20% | Tri-modal | 43.07 |
| 3 | 1.9 | 3.60 | 20% | 129 | 42.54 |
| 4 | 2.8 | 3.60 | 30% | 163 | 40.79 |
| 5 | 2.8 | 3.60 | 40% | 181 | 42.44 |

Figure 2A:
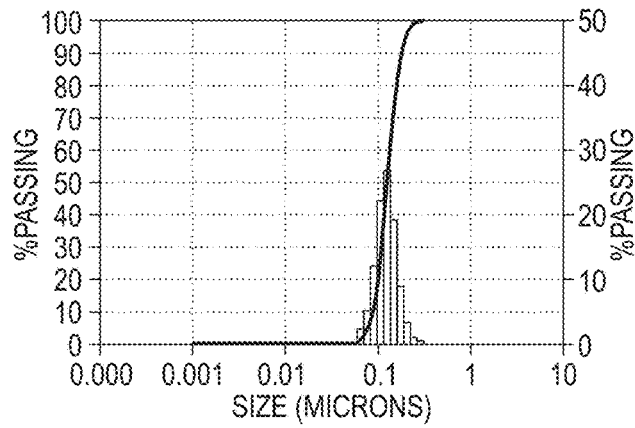
FIGS. 2A-C show a plot of particle sizes obtained on a Nanotrac instrument for Latex Sample ID 3 (FIG. 2A, Table 1), Latex Sample ID 4 (FIG. 2B, Table 1) and Latex Sample ID 5 (FIG. 2C, Table 1). Each sample was prepared from a low molecular weight amorphous polyester resin comprising terpoly-(propoxylated bisphenol A-terephthalate) terpoly-(propoxylated bisphenol A-dodecenylsuccinate) terpoly-(propoxylated bisphenol A fumarate).
Figure 2B:
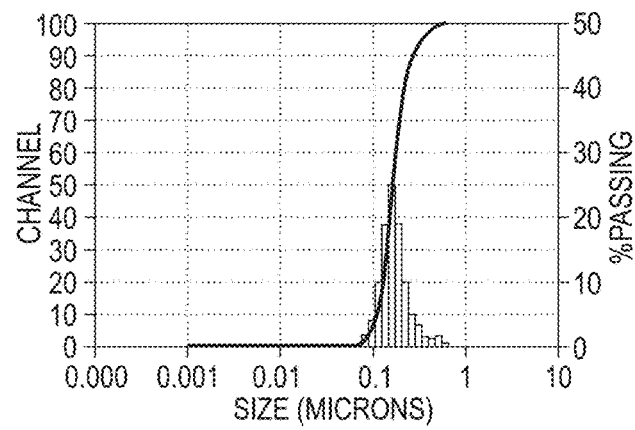
Figure 2C:
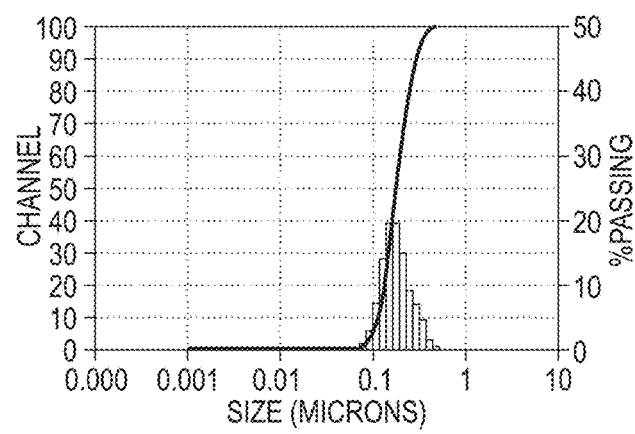

The resulting emulsions were all unimodal as indicated in FIGS. 2A-C for Sample ID 3, 4, and 5, respectively, with minimal coarse fractions with less than about 1% screened through a 25 micron stainless steel sieve.

The study in Table 1 commenced with 0.9 pph sodium hydroxide, 3.60 pph Tayca and 10% of total water added upfront to aid with resin melting. This was a successful process to produce a unimodal latex with particle size within specification range in a short melting time of less than two hours. However, melting the powder resin on a manufacturing scale may require longer times and therefore, a larger fraction of water may be needed upfront to expedite the melting stage. A target goal was set to develop a process with at least 40% water partitioned upfront.

Increasing the water partitioning upfront demands increasing the sodium hydroxide loading as it is diluted by the extra water. A successful formulation and process was developed (Sample ID 5) with 40% water upfront to produce unimodal latex with particle size within range (181 nm) and zero-to-none coarse fraction with processing times less than 90 minutes.

Once a baseline formulation with 40% water partitioning upfront was developed, efforts were focused on lowering the sodium hydroxide loading in the formulation to minimize the risk of resin degradation through the solvent free phase inversion emulsification process. Moreover, the Tayca surfactant loading was optimized to minimize the level of foam formation to mitigate potential excess foaming issues during scale up of the process. The results of the optimization experiments are summarized in the Table 2 below.

TABLE 2

| Sample ID | NaOH pph | Tayca pph | % DIW upfront | PS D50 (nm) | % Solids |
|---|---|---|---|---|---|
| 6 | 1.9 | 3.60 | 40% | 120 | 42.15 |
| 7 | 1.9 | 2.40 | 40% | 146 | 42.38 |

TABLE 2-continued

| Sample ID | NaOH pph | Tayca pph | % DIW upfront | PS D50 (nm) | % Solids |
|---|---|---|---|---|---|
| 8 | 1.9 | 1.6 | 40% | 264 | 42.47 |
| 9 | 1.9 | 2.0 | 40% | 171 | 41.78 |

Figure 3:
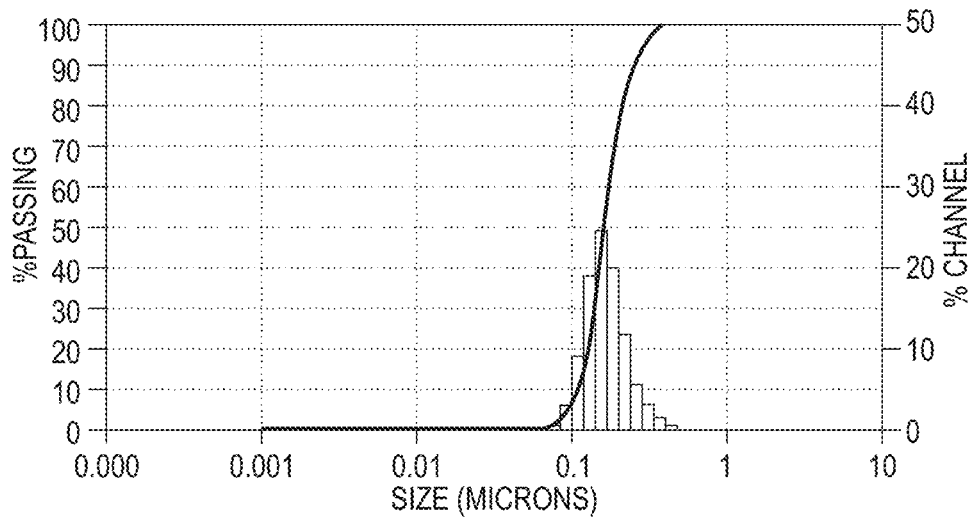
FIG. 3 shows a plot of particle sizes obtained on a Nanotrac instrument for Sample ID 9.

A representative experimental procedure for organic solvent-free phase inversion emulsification is provided for Sample ID 9 as follows: A 2 L Buchi reactor equipped with a P4 agitator was charged with 300 grams of low molecular weight amorphous polyester resin comprising terpoly-(propoxylated bisphenol A-terephthalate) terpoly-(propoxylated bisphenol A-dodecenylsuccinate) terpoly-(propoxylated bisphenol A fumarate), 10 grams of anionic surfactant (TaycaPower BN2060 paste, 60.4 wt %, 2.0 pph), 70.66 grams of sodium hydroxide 2M solution (1.88 pph), and 146.13 grams of deionized water (40% of total water in formulation). The reactor was sealed and heated to 125° C. with a mixing speed of 200 RPM. Once the resin was melted as observed by a change in slope of the temperature profile (45-60 minutes into heating), the mixing was increased to 500 RPM and maintained at 125° C. for 20-30 minutes. The remainder of water (219.2 grams) was pumped into the reactor at an addition rate of 5 grams per minute over 45-50 minutes. At the end of the water addition the reactor was held at 125° C. for an additional 30 minutes prior to cool down. The latex was discharged and sieved through a 25 micron stainless steel sieve. The emulsion obtained had a particle size of 171 nm (FIG. 3) with a solid content of 41.78%. FIG. 3 shows particle size distribution of the amorphous polyester measured on a Nanotrac instrument.

The latex was subsequently dialyzed and dried and submitted for molecular weight and DSC analysis. The data is summarized in Table 3 below and compared against the amorphous polyester resin and the current conventional solvent based latex.

TABLE 3

| Sample ID | Molecular weight by APC | | | | | PS (nm) | % Solids | Tg 2nd onset |
|---|---|---|---|---|---|---|---|---|
| | Mw | Mn | Mp | Mz | Poly-dispersity | | | |
| Amorphous polyester resin control | 14.7 | 4.2 | 10.1 | 28.2 | 3.5 | — | — | 60.0 |
| Conventional solvent-based latex control | 13.7 | 4.1 | 9.1 | 25.8 | 3.4 | 175 | 40.7 | 61.4 |
| 9 | 13.0 | 3.2 | 6.7 | 29.1 | 4.0 | 171 | 41.8 | 54.5 |

After the solvent free emulsification process with 2M sodium hydroxide, the Mw of the FXC42 resin may decrease by 1-2 units, however, still comparable to the Mw of the conventional solvent based control.

Figure 4:
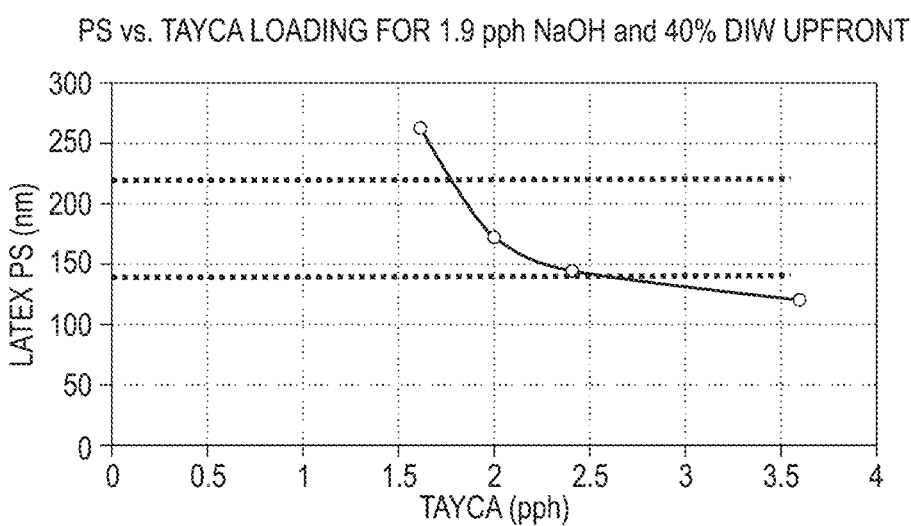
FIG. 4 shows a plot of particle size versus surfactant loading for a solvent free amorphous polyester latex made with 40% water added upfront.
Figure 5:
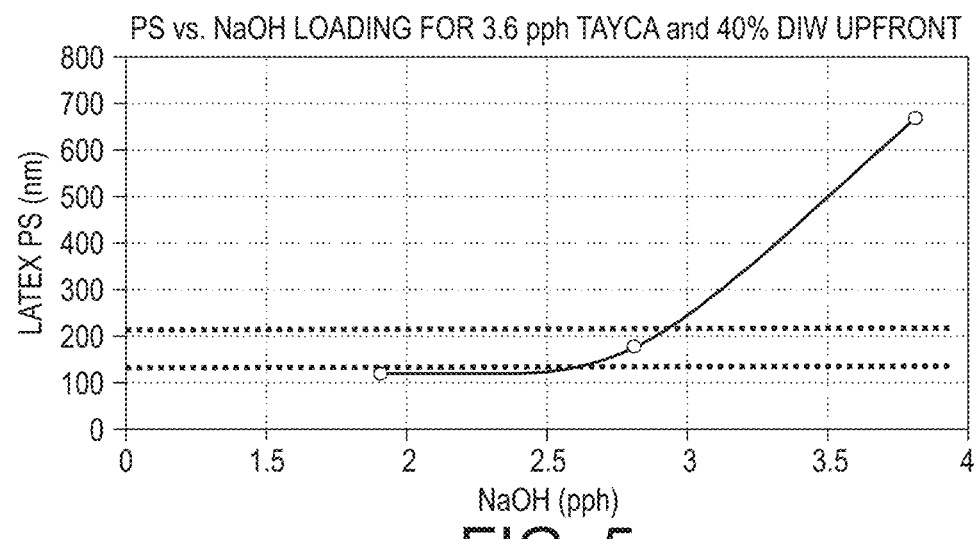
FIG. 5 shows a plot of particle size versus neutralizer loading for a solvent free amorphous polyester latex made with 40% water added upfront.

FIG. 4 and FIG. 5 show graphs for particle size change with Tayca loading and particle size change with sodium hydroxide loading respectively for different solvent free latexes made with above mentioned process. FIG. 4 shows particle size change with surfactant loading for solvent free amorphous polyester latexes made with 40% water added upfront. FIG. 5 shows particle size change with neutralizer loading for solvent free amorphous polyester latexes made with 40% water added upfront. The particle size appears to follow a parabolic trend. The optimal latex production conditions would be in the landing zone of the graphs where the particle size variations with Tayca or sodium hydroxide loading is minimized. Thus, based on FIG. 4 and FIG. 5, good operating conditions to maintain a desirable particle size in a range of about 140 to about 220 nm would be about 1.75 pph to about 2.5 pph Tayca and about 2.0 pph to about 2.8 pph NaOH.

This Example provides a formulation with 40% water added upfront to the amorphous polyester dry powder along with 1.9 pph sodium hydroxide and Tayca loadings as low as 1.6-2 pph, which would produce a stable latex with unimodal and in-spec particle size and minimal coarse fraction.

Example 2

This Example describes the process for making a Pinot Cyan toner using the latex from Sample ID 9.

In a 2 L glass reactor, the following components were combined: 110.52 g amorphous polyester resin in an emulsion (polyester emulsion A), having an average molecular weight (Mw) of about 86,000, a number average molecular weight (Mn) of about 5,600, an onset glass transition temperature (Tg onset) of about 56° C., and about 35% solids; 110.54 g latex from Sample ID 9; 37.09 g crystalline polyester resin in an emulsion, having an Mw of about 23,300, an Mn of about 10,500, a melting temperature (Tm) of about 71° C. and about 35.4% solids; 52.59 g polyethylene wax in an emulsion, having a Tm of about 90° C., and about 30% solids; 61.39 g Pigment Blue 15:3 (phthalocyanine blue pigment) and 651.35 g deionized water. Subsequently, the pH was adjusted from 7.76 to 4.50 with 35.33 g of 0.3M nitric acid. Thereafter, about 35.55 g of a flocculent mixture containing about 3.05 g aluminum sulfate and about 35.50 g of deionized water was added to the slurry under homogenization at 3000-4000 RPM. Thereafter, the mixture was stirred with one P4 shaft at about 300 RPM and heated at a 1° C. per minute temperature increase to a temperature of about 47-48° C. A shell of 59.67 g an amorphous polyester resin in an emulsion (polyester emulsion A), having an average molecular weight (Mw) of about 86,000, a number average molecular weight (Mn) of about 5,600, an onset glass transition temperature (Tg onset) of about 56° C., and about 35% solids; and 59.68 g latex of Sample ID 9 was added to the reactor, after pH adjusted from pH 7.56 to 3.23 with 32.52 g 0.3 M nitric acid. This results in particles having a volume average particle diameter of about 4.3-5.7 µm as measured with a Coulter Counter. The pH of the reactor mixture was adjusted to about 4.5 with a 4% sodium hydroxide solution, followed by the addition of about 6.54 grams of VERSENE 100 [an ethylene diamine tetraacetic acid (EDTA) chelating agent]. The pH of the reactor mixture was then adjusted to about 7.8 with a 4% sodium hydroxide solution, and the stirring reduced to about 180 RPM. The reactor mixture was then heated at a temperature increase of about 1° C. per minute to a temperature of 85° C. while maintaining the pH at 7.8 using 4% sodium hydroxide solution.

The pH of the mixture was then gradually adjusted to about 7.40-7.30 with a sodium acetate buffer solution. The reactor mixture was then gently stirred at about 85° C. for about 2.5-3 hours to coalesce and spherodize the particles. The mixer is then discharged and quenched with deionized ice and maintained a slurry temperature of less than 40° C. while sifting using a 25 µm screen. The toner of this mixture had a volume average particle diameter of about 5.5-5.9 µm, a geometric size distribution (GSD) of about 1.20, and a circularity of about 0.970-0.975. The mixture was then split in half. Half the particles were washed 3 times with deionized water at room temperature and the other half were washed only once. The particles were dried for a minimum of 48 hours using the freeze dryer.

Figure 6:
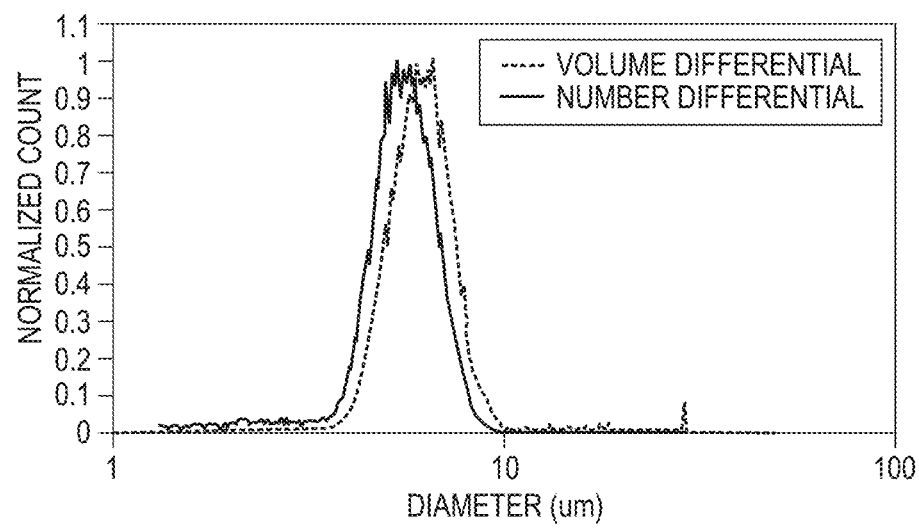
FIG. 6 shows a plot of particle size distribution of toner prepared from the latex of Sample ID 9.
Figure 7A:
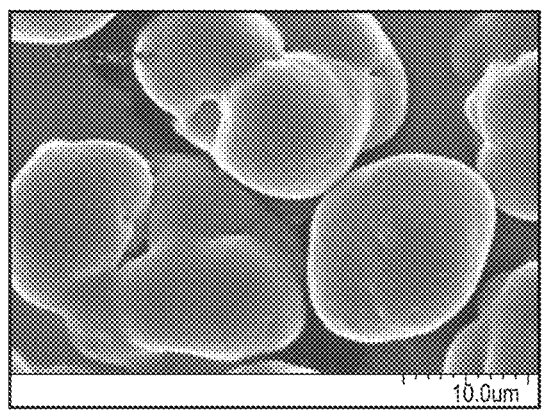
FIGS. 7A-C. show scanning electron microscope (SEM) images of a pinot cyan toner made with solvent free amorphous polyester of Sample ID 9 at different magnifications: at 5 microns (FIG. 7A), at 10 microns (FIG. 7B), and at 10 microns (FIG. 7C).
Figure 7B:
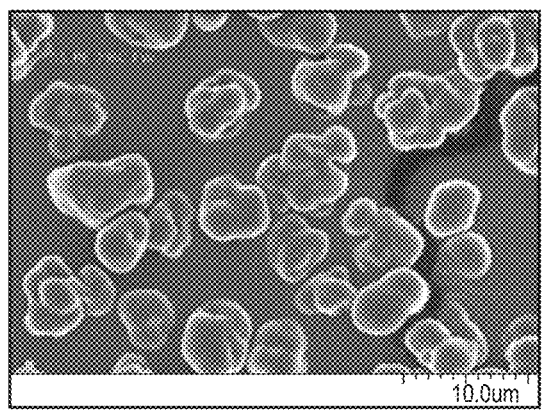
Figure 7C:
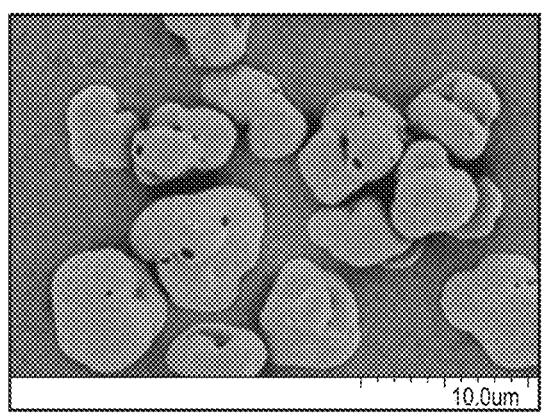

The final toner had smooth particles with minimal wax exposed at surface with narrow size distribution. FIG. 6 and FIG. 7 show the particle size distribution and SEM images of the toner, respectively. FIG. 6 shows the particle size distribution of toner obtained from a Coulter Counter. FIG. 7 shows SEM images of pinot cyan toner made with Sample ID 9 at magnifications of 5.00 micron, 10.0 micron and 10.0 micron, respectively.

The properties of the resulting particles from different washing procedures A and B, half and full wash respectively, are summarized in Table 4 below.

TABLE 4

| Toner ID | Latex | Freeze pH | D50 | GSDv | GSDn | Circ. | Na (ppm) | Al (ppm) |
|---|---|---|---|---|---|---|---|---|
| A | Sample ID 9 | 7.8 | 5.96 | 1.19 | 1.23 | 0.97 | 2074 | 183 |
| B | Sample ID 9 | 7.8 | 5.96 | 1.19 | 1.23 | 0.97 | 1879 | 175 |

The XPS analysis shows Na levels within the nominal Pinot range, confirming that the use of NaOH as the neutralizer for making the solvent free latex does not affect surface sodium levels.

What is claimed is:

1. An organic solvent-free phase-inversion emulsification process for a low molecular weight amorphous polyester resin comprising:
   forming a first mixture by adding sequentially to the dry amorphous polyester resin:
   i. a surfactant;
   ii. an aqueous solution of a neutralizing agent; and
   iii. a portion of water that is from about 10% to about 40% of a total amount of water used to form a phase-inversion emulsion;
   subsequently heating the first mixture to dissolve the amorphous polyester resin to provide a dissolved amorphous polyester in a melted resin mixture; and
   adding water to the melted resin mixture in an amount up to the total amount of water to the dissolved amorphous polyester to form a latex of the amorphous polyester resin, wherein particles of the latex are unimodal and further wherein the time it takes for the process to complete is shorter than if the phase inversion was performed without adding an upfront portion of water before the amorphous polyester resin is melted as recited in (iii).

2. The process of claim 1, wherein particles of the latex have a diameter $D_{50}$ from about 100 nm to about 300 nm.

3. The process of claim 1, wherein the low molecular weight amorphous polyester resin comprises a combination of monomer units selected from the group consisting of a propoxylated bisphenol A, an ethoxylated bisphenol A, a terephthalic acid, a fumaric acid, and a dodecenyl succinic anhydride.

4. The process of claim 1, wherein the low molecular weight amorphous polyester resin has a $T_g$ from about 45° C. to 65° C.

5. The process of claim 1, wherein the low molecular weight amorphous polyester resin has a Mw from about 5,000 Daltons to 60,000 Daltons.

6. The process of claim 1, wherein the surfactant is anionic.

7. The process of claim 1, wherein the surfactant is present in an amount from about 1.5 pph to about 3.5 pph relative to the amount of low molecular weight amorphous resin, by weight.

8. The process of claim 1, wherein the neutralizing agent comprises sodium hydroxide.

9. The process of claim 6, wherein sodium hydroxide is present in and amount from about 1.5 pph to about 4 pph.

10. An organic solvent-free phase-inversion emulsification process of making a toner composition comprising:
    providing a phase-inversion emulsion of an amorphous polyester resin, the phase-inversion emulsion made by a process comprising:
    forming a first mixture by adding sequentially to the dry amorphous polyester resin:
    i. a surfactant;
    ii. an aqueous solution of a neutralizing agent; and
    iii. a portion of water that is from about 10% to about 40% of a total amount of water used to form a phase-inversion emulsion;
    subsequently heating the first mixture to dissolve the amorphous polyester resin to provide a dissolved amorphous polyester in a melted resin mixture; and
    adding water to the melted resin mixture in an amount up to the total amount of water to the dissolved amorphous polyester to form a latex of the amorphous polyester resin; and
    aggregating and coalescing particles of the latex in the presence of a catalyst to form a core toner particle and further wherein the time it takes for the process to complete is shorter than if the phase inversion was performed without adding an upfront portion of water before the amorphous polyester resin is melted as recited in (iii).

11. The process of claim 10, further comprising forming a shell disposed conformally about the core toner particle.

12. The process of claim 10, wherein the aggregating and coalescing step is performed in the presence of a wax.

13. The process of claim 10, wherein the aggregating and coalescing step is performed in the presence of a crystalline polyester latex.

14. The process of claim 10, wherein the surfactant is anionic and is present in an amount from about 1.5 pph to about 3.5 pph relative to the amount of low molecular weight amorphous resin, by weight.

15. The process of claim 10, wherein the neutralizing agent comprises sodium hydroxide.

16. The process of claim 15, wherein sodium hydroxide is present in and amount from about 1.5 pph to about 4 pph.

* * * * *